United States Patent
Stoicescu et al.

(10) Patent No.: US 10,323,648 B2
(45) Date of Patent: Jun. 18, 2019

(54) IMPELLERS FOR ENGINE MOUNTED BOOST STAGE PUMPS

(71) Applicant: Hamilton Sundstrand Corporation, Charlotte, NC (US)

(72) Inventors: Adrian L. Stoicescu, Roscoe, IL (US); Benjamin T. Harder, DeKalb, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 245 days.

(21) Appl. No.: 15/482,278

(22) Filed: Apr. 7, 2017

(65) Prior Publication Data
US 2018/0291919 A1    Oct. 11, 2018

(51) Int. Cl.
| | |
|---|---|
| *F04D 29/42* | (2006.01) |
| *F04D 29/22* | (2006.01) |
| *F04D 1/02* | (2006.01) |
| *F04D 29/24* | (2006.01) |
| *F02C 7/22* | (2006.01) |

(52) U.S. Cl.
CPC ............... *F04D 29/22* (2013.01); *F02C 7/22* (2013.01); *F04D 1/025* (2013.01); *F04D 29/2277* (2013.01); *F04D 29/242* (2013.01); *F04D 29/426* (2013.01); *F05D 2220/323* (2013.01); *F05D 2250/74* (2013.01); *Y02T 50/673* (2013.01)

(58) Field of Classification Search
CPC .... F04D 29/22; F04D 29/242; F04D 29/2277; F04D 29/426; F04D 1/025; F02C 7/22; Y02T 50/673; F05D 2220/323; F05D 2250/74

USPC .......................................................... 415/206
See application file for complete search history.

(56) References Cited

U.S. PATENT DOCUMENTS

| | | | |
|---|---|---|---|
| 8,579,591 B2* | 11/2013 | Ho | F04D 29/284 29/888.024 |
| 9,562,502 B2* | 2/2017 | Stoicescu | F02M 37/08 |
| 10,151,321 B2* | 12/2018 | Lentz | F01D 5/048 |
| 2013/0183155 A1 | 7/2013 | Stoicescu et al. | |
| 2016/0097399 A1 | 4/2016 | Stoicescu et al. | |

OTHER PUBLICATIONS

Extended European search report for European Patent No. 18166198.4, dated Aug. 6, 2018.

* cited by examiner

*Primary Examiner* — Hai H Huynh
(74) *Attorney, Agent, or Firm* — Locke Lord LLP; Scott D. Wofsy; Joshua L. Jones

(57) ABSTRACT

A boost pump includes a boost cover and a main pump housing engaged opposite to the boost cover with an impeller rotatably engaged between the boost cover and main pump housing. The impeller includes an inducer section comprising a hub including a plurality of axial blades extended therefrom, each of the plurality of blades including a root, a tip, first and second surfaces, wherein the each of the first and second surfaces is defined in TABLE 1. The impeller includes an impeller section comprising a shroud extending from the hub including a plurality of radial blades extended therefrom. Each of the plurality of blades can include including a root, a tip, and opposed pressure and suction sides extending from the root to the tip, wherein the each of the pressure and suction sides is a surface defined in at least one of TABLES 2-4.

17 Claims, 5 Drawing Sheets

IMPELLERS FOR ENGINE MOUNTED BOOST STAGE PUMPS

BACKGROUND OF THE INVENTION

1. Field of the Invention

The present disclosure relates to an aircraft jet engine mounted fuel boost pump, and in particular to impeller blades for such pumps.

2. Description of Related Art

The engine mounted boost pump is conventionally packaged together with the main fuel pump, which is usually of a positive displacement gear pump type, both being driven by a common shaft. The fuel leaving the boost stage goes through a filter and a fuel oil heat exchanger before entering the main pump. Pressure losses are introduced by these components and the associated plumbing, while heat is also added to the fuel. The fuel feeding the boost pump comes from the main frame fuel tanks through the main frame plumbing. The tanks are usually vented to the ambient atmospheric pressure, or, in some cases, are pressurized a two or three pounds per square inch (psi), or 0.136 atm to 0.204 atm, above that. The tanks are provided with immersed pumping devices, which are in some cases axial flow pumps driven by electric motors or turbines, or in other cases ejector pumps. These devices are called here in main frame boost pumps.

During flight, the pressure in the tank decreases with altitude following the natural depression in the ambient atmospheric pressure. Under normal operating conditions, industry standards require the main frame boost pumps to provide uninterrupted flow to the engine mounted boost pumps at a minimum of 5 psi (0.340 atm) above the true vapor pressure of the fuel and with no V/L (vapor liquid ratio) or no vapor present as a secondary phase. Under abnormal operation, which amounts to inoperable main frame boost pumps, the pressure at the inlet of the engine mounted boost stage pumps can be only 2, or 3 psi (0.136 atm to 0.204 atm) above the fuel true vapor pressure, while vapor can present up to a V/L ratio of 0.45, or more. Definition of conventional terms, recommended testing practices, and fuel physical characteristics are outlined in industry specifications and standards like Coordinating Research Council Report 635, AIR 1326, SAE ARP 492, SAE ARP 4024, ASTM D 2779, and ASTM D 3827 to name only a few.

During normal or abnormal operation, the engine mounted boost pump is required to maintain enough pressure at the main pump inlet under all the operating conditions encountered in a full flight mission such the main pump can maintain the demanded output flow and pressure to the fuel control and metering unit for continuous and uninterrupted engine operation. There are also limitations in the maximum pressure rise the engine mounted boost pump is allowed to deliver such as not to exceed the mechanical pressure rating of the fuel oil heat exchanger, or limitations pertaining to minimum impeller blade spacing such that a large contaminant like a bolt lost from maintenance interventions would pass through and be trapped safely in the downstream filter. All these requirements along with satisfying a full flow operating range from large flows during takeoff to a trickle of flow during flight idle descent, and fuel temperature swings from −40 F to 300 F (−40 C to 148.9 C), makes the aerodynamic design of the engine mounted fuel pumps a serious challenge.

The conventional techniques have been considered satisfactory for their intended purpose. However, there is an ever present need for improved boost pumps. This disclosure provides a solution for this problem.

SUMMARY OF THE INVENTION

A boost pump includes a boost cover and a main pump housing engaged opposite to the boost cover with an impeller rotatably engaged between the boost cover and main pump housing. The impeller includes an inducer section comprising a hub including a plurality of axial blades extended therefrom, each of the plurality of blades including a root, a tip, first and second surfaces, wherein the each of the first and second surfaces is defined as a set X, Y, and Z Cartesian coordinates set out in TABLE 1. The impeller includes an impeller section having a plurality of radial blades extended from the hub. Each of the plurality of blades can include including a root, a tip, and opposed pressure and suction sides extending from the root to the tip, wherein the each of the pressure and suction sides is a surface defined as a set X, Y, and Z Cartesian coordinates set out in at least one of TABLES 2-4.

The plurality of blades of the impeller section can include a set of long blades, the pressure and suction sides of which are defined by TABLE 2, a set of primary splitter blades, the pressure and suction sides of which are defined by TABLE 3, and a set of secondary splitter blades, the pressure and suction sides of which are defined by TABLE 4. The plurality of blades of the impeller can be arranged in a repeating, circumferential pattern in this order: secondary splitter blade, primary splitter blade, long blade going clockwise as viewed toward the inducer.

A method of forming an impeller for a boost pump includes forming an impeller including an inducer section with a hub including a plurality of blades extended therefrom, each of the plurality of blades including a root, a tip, first and second surfaces, wherein the each of the first and second surfaces is defined as described above, and an impeller section with a plurality of blades extended from the hub, each of the plurality of blades including a root, a tip, and opposed pressure and suction sides extending from the root to the tip, wherein the each of the pressure and suction sides is a surface defined as described above. The forming can include machining the blades, casting the blades, and/or any other suitable technique.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

Figure 1:
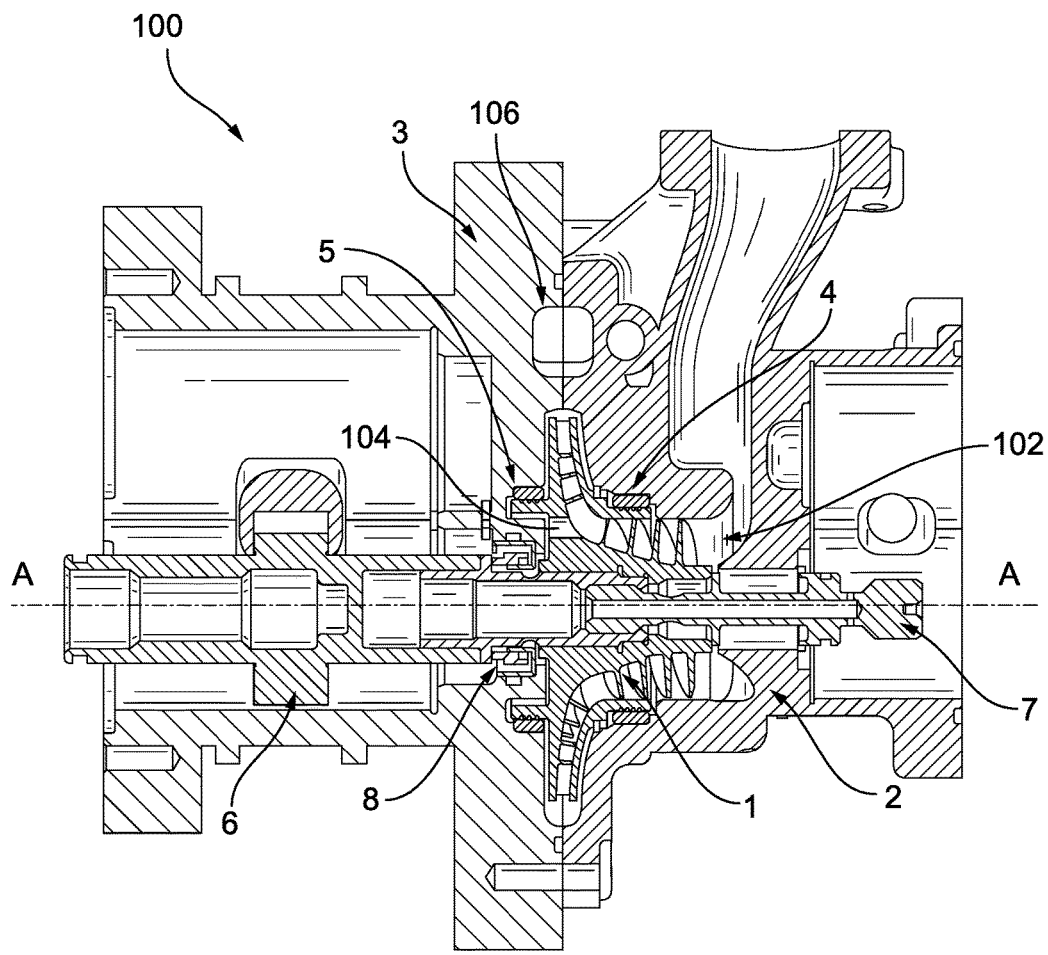
FIG. 1 is a cross-sectional view of an exemplary embodiment of an engine mounted boost pump constructed in accordance with the present disclosure, showing the boost stage impeller between the boost housing cover and the main pump housing.

TABLE 1 is a coordinate table defining the inducer blade geometry for the boost pump of FIG. 1.

TABLE 2 is a coordinate table defining the impeller long blade geometry for the boost pump of FIG. 1.

TABLE 3 is a coordinate table defining the impeller primary splitter blade geometry for the boost pump of FIG. 1.

TABLE 4 coordinate table defining the impeller secondary splitter blade geometry for the boost pump of FIG. 1.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of a boost pump in accordance with the disclosure is shown in FIG. 1 and is designated generally by reference character 100. Other embodiments of boost pump assemblies in accordance with the disclosure, or aspects thereof, are provided in FIGS. 2-5, as will be described.

Embodiments disclosed herein of impeller blades and volute collectors are developed by analytical and empirically based similitude models, along with quasi three dimensional flow calculations, and supported by verification simulations using computational fluid dynamics (CFD) models for single phase flow, two phase flow, thermal analysis, and fluid solid interaction analysis.

In order to achieve the pressure rise demanded by the downstream main fuel pump and fuel metering system and to also be able of operating with extreme low suction conditions encountered during the abnormal operation, the engine mounted boost pump impellers are provided with a radial blade section and with an axial blade section upstream of it. The radial blade section is commonly referred to as the impeller blade section, while the axial blade section is called the inducer blade section. The inducer's primary function is to sustain good pressure and flow conditions at the inlet of the impeller radial section even under the low suction conditions imposed by the abnormal operation, where the main frame boost pumps are inoperable.

The gap between the minimum required supply pressure for normal engine operation and the maximum allowed discharge pressure demanded by pressure rating limitations of the inter-stage fuel oil heat exchanger are often so narrow, that the final design is determined only after the first unit went through design and development testing. The impeller diameter, which primarily controls the boost pump pressure rise, is intentionally set to a slightly larger value in the initial design, the unit built and tested, and ultimately the impeller diameter is trimmed to its final value such to match all the constraints imposed by the requirements.

A disclosed engine mounted boost pump inducer section includes a plurality of blades, each of which includes cross sectional surfaces normal to the blade mean line distributed over the entire length of the blades. The cross sectional surfaces are defined as a set of X-coordinates, Y-coordinates and Z-coordinates set out in TABLE 1 as further described below.

A disclosed engine mounted boost pump impeller section includes a plurality of long blades, a plurality of primary splitter blades, and a plurality of secondary splitter blades, that each includes normal to the blade mean line cross sectional surfaces distributed over the entire length of the blades. The cross sectional surfaces are defined as a set of X-coordinates, Y-coordinates and Z-coordinates set out in TABLE 2, TABLE 3, and TABLE 4, as further described below.

FIG. 1 shows a cross-sectional view of the engine mounted boost pump 100 having the longitudinal axis A, i.e. the boost pump rotation axis. The engine mounted boost pump 100 includes a shrouded impeller 1, a boost housing cover 2, a main pump housing 3, a front labyrinth seal 4, a rear labyrinth 5, and a rear side face seal 8. Also shown are elements of the main fuel pump of gear pump type like drive gear 6 and motive stage coupling shaft 7.

During operation fuel flow enters through the inlet 102 from the far right side opening of the boost pump housing cover 2 flowing axially from right to left. The fuel flow then enters first the inducer blades of the rotating impeller 1 where the pressure is raised and the eventual air and vapor phase present in the mixture are compressed back in to solution such that by the time the fuel flow reaches the impeller blades most of the mixture is in the liquid phase. The fuel flow then enters the impeller radial blade section where the majority of the pressure rise takes place, while the fluid absolute velocity is greatly increased. The fuel flow leaves the impeller at its outside diameter exit port under significantly larger pressure and with large velocity in an almost tangential direction. At this location, the flow stream contains potential energy based on the actual static pressure and a good amount of kinetic energy due to the high flow velocity. It is the purpose of the volute collector to gradually capture this flow stream, progressively slow its velocity down and guide it towards the boost pump discharge port. By slowing down the flow stream velocity in a smooth way and without generating of any eddies, the majority of the kinetic energy of the flow stream is transformed into potential energy, or pressure. At the exit port 106 of the boost pump 100, flow is delivered to the downstream system at much higher pressure than that from the boost pump inlet 102 and with a relatively low velocity commonly used in the fuel system plumbing to deliver the fuel flow throughout the system.

Figure 2:
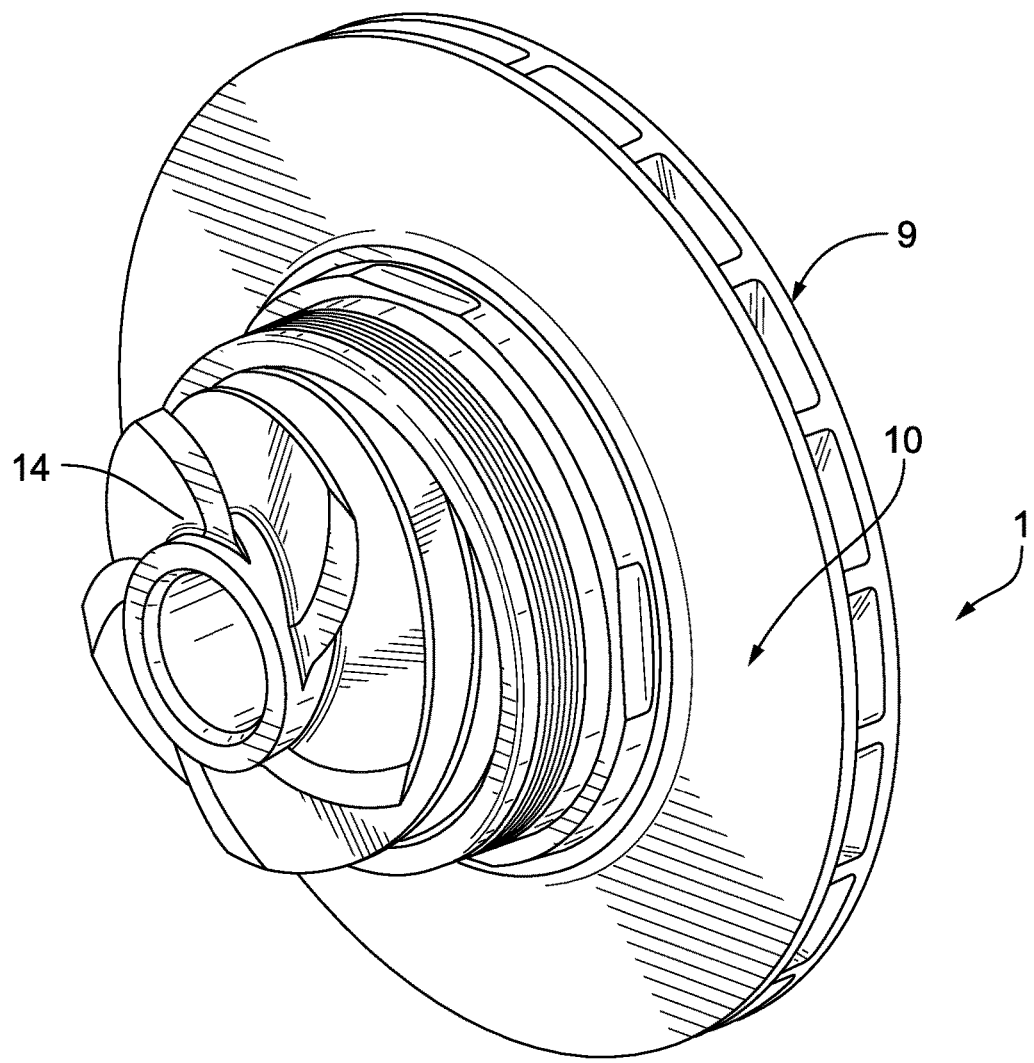
FIG. 2 is a perspective view of the boost stage impeller of FIG. 1, showing the inducer.

FIG. 2 shows a perspective view of the impeller 1. The impeller 1 and its blades can be cast or machined. The machined option is can achieve smoother surface finish, while smoother surfaces show lower energy losses due to viscous drag at the outside surfaces of the shroud 10 and at the blade surfaces. Machined impellers can be split in two components, a hub 9 and a shroud 10. The inducer blades 13 and impeller blades (which are described below and shown in FIG. 3) are machined directly in the hub 9 as one piece. The shroud 10 is machined separately and attached by brazing to the hub 9. In case the impeller 1 is mounted on the drive shaft by means of a thread, the shroud 10 can be provided with a couple of notches as a wrenching feature.

Figure 3:
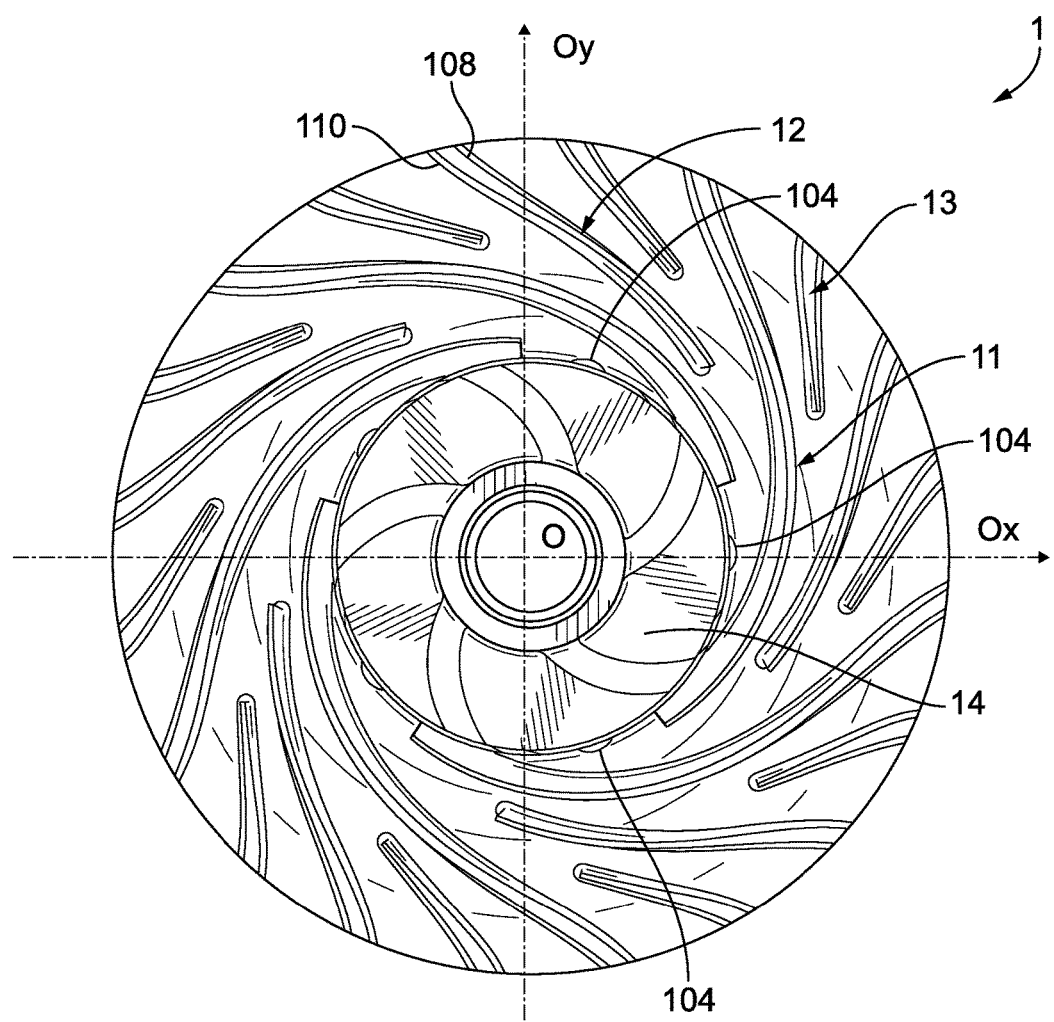
FIG. 3 is a front view of the boost stage impeller of FIG. 1 with front shroud removed.

FIG. 3 shows a front view of the impeller 1 with the front shroud 10 removed. The impeller section 52 has three sets of blades, a set of long blades 11, a set of primary splitter blades 12, and a set of secondary splitter blades 13. A typical impeller blade works by engaging the incoming flow at the leading edge of the blade with some incidence and by guiding the flow along its length all the way to impeller exit port at impeller OD efficiently and without generating eddies or flow separation. The fluid stream is forced by the cascade of blades 11, 12, and 13 into a complex rotational motion combined with a longitudinal and radial motion. The direction of rotation is indicated schematically in FIG. 4 with the large arrow. The inertial effects of the centrifugal and Coriolis forces introduced by the forced fluid motion impart pressure into the fluid. The blade surface running against the fluid develops higher pressures and it is called pressure side 108, while on the opposite side of the blade a depression is created and this side is called suction side 110 (for sake of clarity these are only labeled in FIG. 3 for one of the blades 12, but all of the blades 11, 12, and 13 include suction sides 110 and pressure sides 108). The blade shape and length can be optimized by means of analytical calculations and CFD flow simulation such to impart the required amount of work into the fluid with minimum viscous drag and without introducing eddies, or flow separation.

Figure 4:
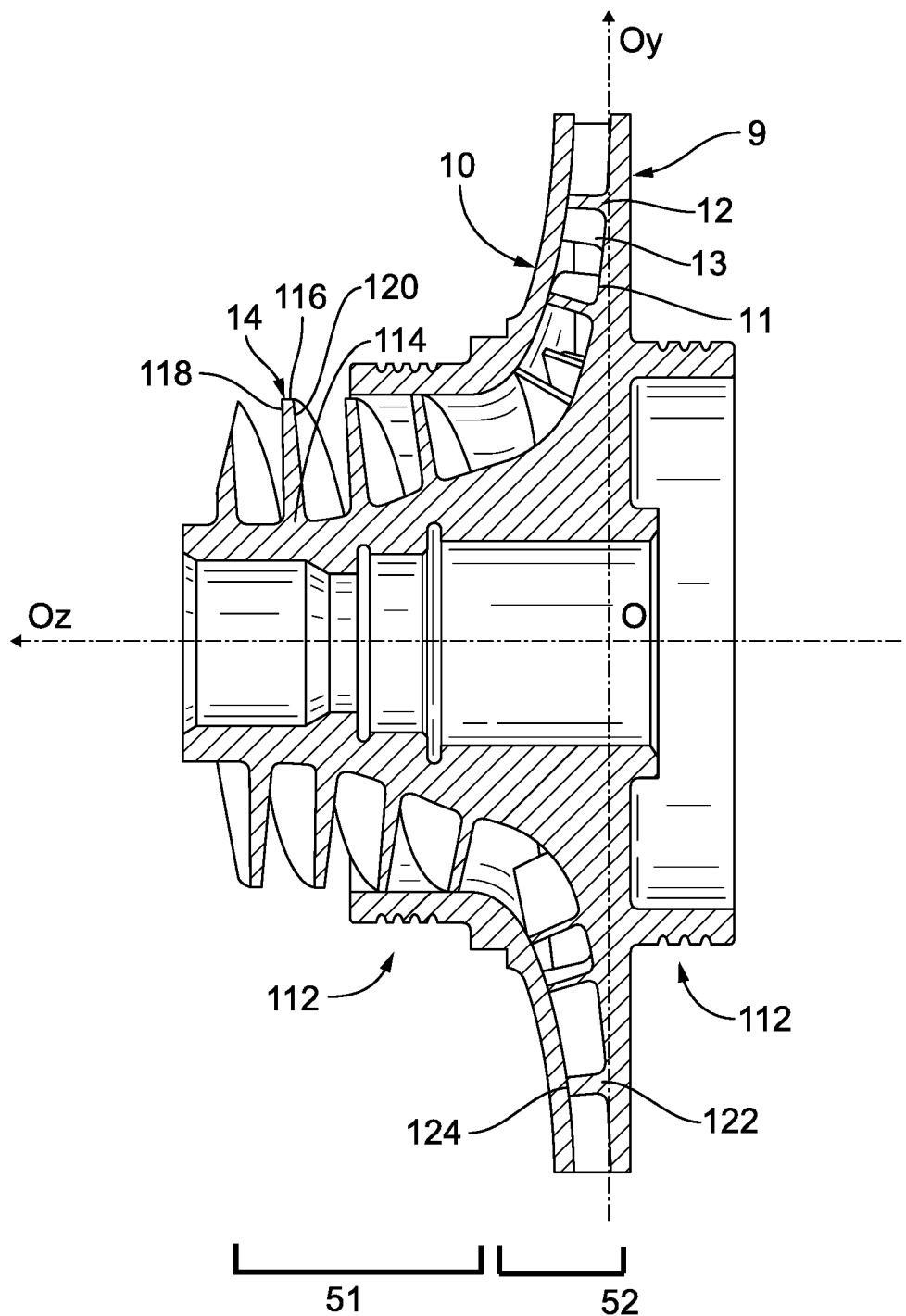
FIG. 4 is a cross-sectional side elevation view of the boost stage impeller of FIG. 1 with front shroud included.

Similarly, the inducer section 51, identified in FIG. 4, has a set of blades 14. The inducer blades 18 and 19 are axial as opposed to mostly radial as in the impeller section 52. The fluid stream guidance and energy transfer mechanism between the blades 14 and the fluid are similar to those encountered in the impeller section 52, except for the fact that the calculations are based on a two phase mixture. The mixture contains a liquid phase and a gaseous phase, where the gaseous phase contains air and vapor of the fuel. Staring from the inlet 102 shown in FIG. 1, the pressure is progressively rising due to the work imposed by the blades, and consequently the vapor and air present in the gaseous phase are compressed back into solution. The hub shape in the inducer section 51 is specially designed to provide larger volume towards inlet 102 where the specific volume of the two phase mixture is the smallest.

FIG. 4 shows a cross-sectional side view of the impeller 1 respectively. The inducer section 51, i.e. with blades 14, and impeller section 52, i.e. with blades 11, 12, and 13, are clearly visible here. The two turns with radial grooves 112 on the front of shroud 10 and rear of hub 9 are the runners for the impeller seals, which serve the function of preventing excessive leakage from impeller exit port 106 flow back towards the inlet 102 (the exit port 106 and inlet 102 are shown in FIG. 1). The hub 9 is also provided with a number of axial holes 104 shown in FIG. 3, such the cavity under the rear hub seal runner is vented to the inducer section 51 pressure. By careful sizing of the front and rear seal runners in terms of diameter, the loads due to the pressure distribution on the front side and rear side of the impeller 1 are brought to an almost perfect balance.

Figure 5:
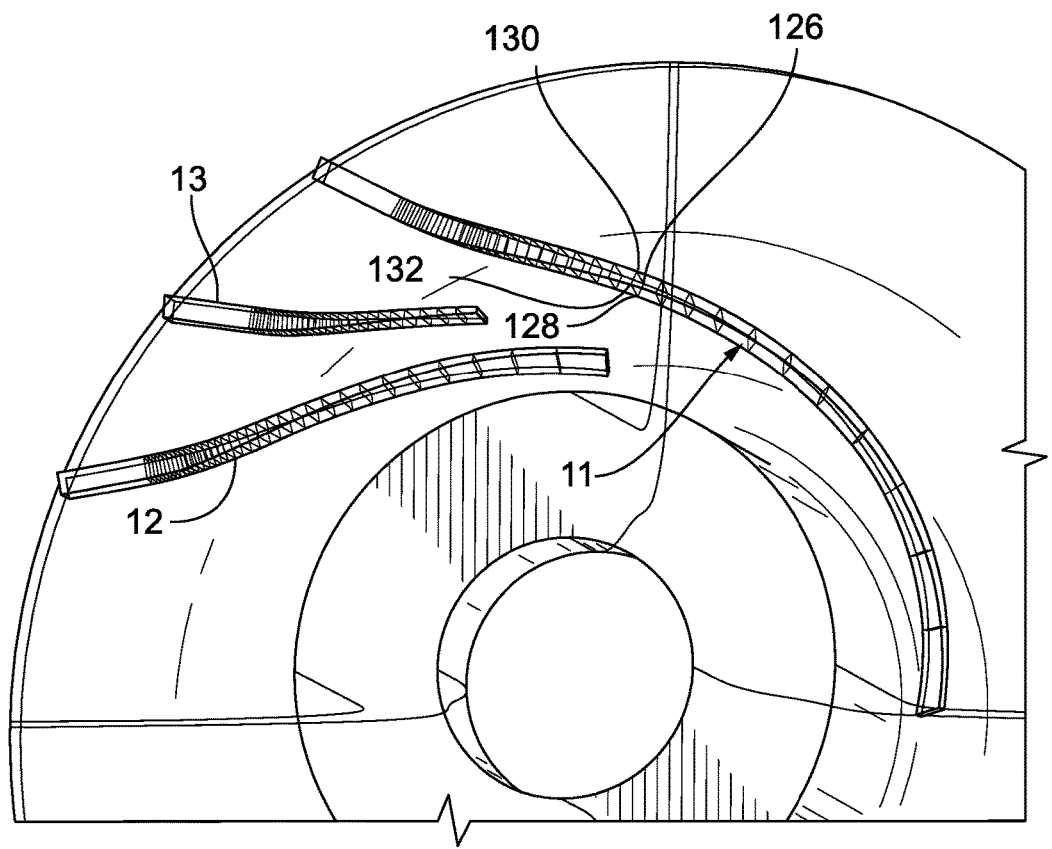
FIG. 5 is a schematic view of the impeller blades of the boost pump of FIG. 1, showing geometry defining cross sections in wire frame.

FIG. 5 shows a front view of the impeller blades 11, 12, and 13 along with the cross section shown in wire frame defining the blade geometry. The blade thickness varies along each the blade 11, 12, and 13 as well as from hub 9 to shroud 10 (shown in FIG. 4) in a linear progression. As a result, each cross section has a rectangular shape and is defined by means of numerical coordinates of the four corner points 126, 128, 130, and 132 (which for sake of clarity are only shown for one cross-sectional rectangle in FIG. 5). The coordinates of all the cross sections used to generate the geometry of the blades 11, 12, and 13 are listed in a Cartesian coordinate system, which lines up with the impeller and pump axis A shown in FIG. 1. The four corner points of each cross section are farther named hub pressure side (e.g., corner point 126), hub suction side (e.g., corner point 128), shroud pressure side (e.g., corner point 130), and shroud suction side (e.g., corner point 132) based on their physical location. The final shape of the blade is obtained by cubic spline interpolation between the corresponding points of all the cross sections composing a blade. The blade coordinate tables defining the inducer blades and the impeller blades are listed under TABLE 1 through TABLE 4 using the physical locations named above as the names of the vertical columns, and using the Ox, Oy, Oz axes identified in FIGS. 3 and 4 for the respective X, Y, and Z coordinates listed in TABLES 1-4.

TABLES 1 through 4 defining the inducer/impeller blade geometry are shown in a Cartesian coordinate system for X, Y, and Z of each blade surface. The Cartesian coordinate system Z axis aligns with datum A-A the boost pump rotor axis of rotation, i.e. axis A of FIG. 1, with the Z zero coordinate in the axial plane containing the impeller inside hub surface at impeller outside diameter as shown in FIG. 4. The positive direction of the Z axis points towards the boost pump inlet 102 of FIG. 1. The table values are computer-generated and shown to four decimal places. However, in view of manufacturing constraints, actual values useful for manufacture of the component are considered to be within the scope of this disclosure. There are typical manufacturing tolerances which must be accounted for in the profile. Accordingly, the Table coordinate values are for nominal component. It will therefore be appreciated that plus or minus typical manufacturing tolerances are applicable to the Table coordinate values and that a component having a profile substantially in accordance with those values includes tolerances. For example, a manufacturing tolerance of about +/−0.010 inches (0.0254 cm) on surface profile should be considered within the design limits for the component. Thus, the mechanical and aerodynamic function of the component is not impaired by manufacturing imperfections and tolerances, which in different embodiments may be greater or lesser than the values set forth in the disclosed Tables. As appreciated by those skilled in the art, manufacturing tolerances may be determined to achieve a desired mean and standard deviation of manufactured components in relation to the ideal component profile points set forth in the disclosed Tables.

With reference again to FIG. 2, a boost pump 100 includes a boost cover 2 and a main pump housing 3 engaged opposite to the boost cover 2 with an impeller 1 rotatably engaged between the boost cover 2 and main pump housing 3. The impeller includes an inducer section 51, identified in FIG. 4, comprising a hub 9 including a plurality of axial blades 14 extended therefrom, each of the plurality of blades 14 including a root 114, a tip 116, first and second surfaces 118 and 120 shown in FIG. 4, wherein the each of the first and second surfaces is defined as a set X, Y, and Z Cartesian coordinates set out in at TABLE 1.

The impeller 1 also includes an impeller section 52 comprising a shroud 10 extending from the hub 9 including a plurality of radial blades 11, 12, and 13 extended therefrom, each of the plurality of blades 11, 12, and 13 including a root 122, a tip 124 (shown in FIG. 4), and opposed pressure and suction sides 108 and 110 (shown in FIG. 3) extending from the root to the tip, wherein the each of the pressure and suction sides is a surface defined as a set X, Y, and Z Cartesian coordinates set out in at least one of TABLES 2 through 4.

The plurality of blades of the impeller section 52 includes a set of long blades 11, the pressure and suction sides of which are defined by TABLE 2, a set of primary splitter blades 12, the pressure and suction sides of which are defined by TABLE 3, and a set of secondary splitter blades 13, the pressure and suction sides of which are defined by TABLE 5. The plurality of blades 11, 12, and 13 of the impeller 1 are arranged in a repeating, circumferential pattern in this order: secondary splitter blade 13, primary splitter blade 12, long blade 11 going clockwise as viewed toward the inducer as in FIG. 3.

A method of forming an impeller for a boost pump includes forming an impeller including an inducer section with a hub including a plurality of blades extended therefrom, each of the plurality of blades including a root, a tip, first and second surfaces, wherein the each of the first and second surfaces is defined as described above, and an impeller section with a plurality of blades extended from the hub, each of the plurality of blades including a root, a tip, and opposed pressure and suction sides extending from the root to the tip, wherein the each of the pressure and suction sides is a surface defined as described above. The forming includes machining the blades, casting the blades, and/or any other suitable technique.

The table values in TABLES 1-4 are normalized. Those skilled in the art will ready appreciate that the values can be multiplied by any suitable factor to, e.g., the dimensions can be taken as inches, centimeters, or can be multiplied by any suitable factor for a given application.

The methods and systems of the present disclosure, as described above and shown in the drawings, provide for boost pumps with superior properties including fluid dynamic efficiency and manufacturability. While the apparatus and methods of the subject disclosure have been shown and described with reference to preferred embodiments, those skilled in the art will readily appreciate that changes and/or modifications may be made thereto without departing from the scope of the subject disclosure.

TABLE 1

| station number | X | Y | Z | X | Y | Z | X | Y | Z | X | Y | Z |
|---|---|---|---|---|---|---|---|---|---|---|---|---|
| | shroud pressure side | | | shroud suction side | | | hub suction side | | | hub pressure side | | |
| 1 | 0.9350 | −0.0021 | 1.6536 | 0.9350 | 0.0021 | 1.6742 | 0.4449 | −0.0082 | 1.6445 | 0.4449 | 0.0082 | 1.6839 |
| 2 | 0.9349 | 0.0156 | 1.6493 | 0.9348 | 0.0201 | 1.6713 | 0.4450 | −0.0002 | 1.6395 | 0.4447 | 0.0172 | 1.6813 |
| 3 | 0.9332 | 0.0576 | 1.6402 | 0.9329 | 0.0624 | 1.6637 | 0.4446 | 0.0193 | 1.6294 | 0.4434 | 0.0378 | 1.6737 |
| 4 | 0.9274 | 0.1193 | 1.6270 | 0.9267 | 0.1243 | 1.6520 | 0.4424 | 0.0483 | 1.6151 | 0.4398 | 0.0676 | 1.6619 |
| 5 | 0.9138 | 0.1978 | 1.6104 | 0.9127 | 0.2031 | 1.6368 | 0.4367 | 0.0853 | 1.5971 | 0.4323 | 0.1054 | 1.6463 |
| 6 | 0.8886 | 0.2908 | 1.5904 | 0.8868 | 0.2962 | 1.6183 | 0.4258 | 0.1294 | 1.5756 | 0.4190 | 0.1499 | 1.6273 |
| 7 | 0.8475 | 0.3950 | 1.5673 | 0.8449 | 0.4004 | 1.5967 | 0.4074 | 0.1790 | 1.5508 | 0.3978 | 0.1995 | 1.6049 |
| 8 | 0.7862 | 0.5062 | 1.5412 | 0.7827 | 0.5114 | 1.5721 | 0.3796 | 0.2321 | 1.5228 | 0.3668 | 0.2520 | 1.5794 |
| 9 | 0.7009 | 0.6189 | 1.5123 | 0.6965 | 0.6238 | 1.5446 | 0.3406 | 0.2864 | 1.4918 | 0.3242 | 0.3048 | 1.5509 |
| 10 | 0.5888 | 0.7263 | 1.4805 | 0.5834 | 0.7306 | 1.5143 | 0.2889 | 0.3385 | 1.4579 | 0.2688 | 0.3546 | 1.5194 |
| 11 | 0.4487 | 0.8203 | 1.4461 | 0.4424 | 0.8237 | 1.4814 | 0.2237 | 0.3847 | 1.4211 | 0.2002 | 0.3974 | 1.4851 |
| 12 | 0.2814 | 0.8916 | 1.4091 | 0.2743 | 0.8939 | 1.4458 | 0.1454 | 0.4206 | 1.3816 | 0.1189 | 0.4288 | 1.4480 |
| 13 | 0.0907 | 0.9306 | 1.3695 | 0.0829 | 0.9313 | 1.4077 | 0.0556 | 0.4415 | 1.3393 | 0.0270 | 0.4442 | 1.4082 |
| 14 | −0.1166 | 0.9277 | 1.3281 | −0.1244 | 0.9267 | 1.3663 | −0.0425 | 0.4430 | 1.2944 | −0.0721 | 0.4391 | 1.3658 |
| 15 | −0.3298 | 0.8749 | 1.2843 | −0.3371 | 0.8721 | 1.3225 | −0.1444 | 0.4215 | 1.2470 | −0.1728 | 0.4095 | 1.3208 |
| 16 | −0.5347 | 0.7670 | 1.2380 | −0.5411 | 0.7625 | 1.2762 | −0.2448 | 0.3748 | 1.1982 | −0.2677 | 0.3540 | 1.2719 |
| 17 | −0.7146 | 0.6030 | 1.1894 | −0.7196 | 0.5970 | 1.2276 | −0.3366 | 0.3016 | 1.1470 | −0.3508 | 0.2738 | 1.2205 |
| 18 | −0.8510 | 0.3874 | 1.1385 | −0.8542 | 0.3803 | 1.1765 | −0.4116 | 0.2020 | 1.0933 | −0.4149 | 0.1705 | 1.1666 |
| 19 | −0.9257 | 0.1316 | 1.0853 | −0.9268 | 0.1239 | 1.1232 | −0.4610 | 0.0779 | 1.0391 | −0.4523 | 0.0484 | 1.1084 |
| 20 | −0.9235 | −0.1461 | 1.0298 | −0.9223 | −0.1539 | 1.0675 | −0.4751 | −0.0638 | 0.9825 | −0.4561 | −0.0871 | 1.0478 |
| 21 | −0.8350 | −0.4208 | 0.9720 | −0.8314 | −0.4278 | 1.0095 | −0.4461 | −0.2135 | 0.9237 | −0.4198 | −0.2271 | 0.9847 |
| 22 | −0.6607 | −0.6616 | 0.9121 | −0.6550 | −0.6673 | 0.9493 | −0.3692 | −0.3568 | 0.8626 | −0.3399 | −0.3588 | 0.9193 |
| 23 | −0.4143 | −0.8382 | 0.8500 | −0.4070 | −0.8418 | 0.8868 | −0.2450 | −0.4774 | 0.7993 | −0.2174 | −0.4676 | 0.8515 |
| 24 | −0.1217 | −0.9270 | 0.7857 | −0.1133 | −0.9281 | 0.8222 | −0.0804 | −0.5583 | 0.7335 | −0.0590 | −0.5394 | 0.7815 |
| 25 | 0.1833 | −0.9169 | 0.7194 | 0.1919 | −0.9151 | 0.7561 | 0.1104 | −0.5833 | 0.6646 | 0.1239 | −0.5623 | 0.7101 |
| 26 | 0.4654 | −0.8109 | 0.6509 | 0.4735 | −0.8063 | 0.6879 | 0.3042 | −0.5403 | 0.5936 | 0.3112 | −0.5201 | 0.6365 |
| 27 | 0.6947 | −0.6258 | 0.5803 | 0.7012 | −0.6185 | 0.6175 | 0.4745 | −0.4332 | 0.5206 | 0.4768 | −0.4150 | 0.5605 |
| 28 | 0.8510 | −0.3873 | 0.5078 | 0.8553 | −0.3778 | 0.5459 | 0.5930 | −0.2738 | 0.4456 | 0.6065 | −0.2639 | 0.4820 |

TABLE 2

| station number | X | Y | Z | X | Y | Z | X | Y | Z | X | Y | Z |
|---|---|---|---|---|---|---|---|---|---|---|---|---|
| | shroud pressure side | | | shroud suction side | | | hub suction side | | | hub pressure side | | |
| 1 | 1.0248 | 0.0016 | 0.3497 | 1.0100 | 0.0046 | 0.3627 | 0.8851 | 0.0023 | 0.1576 | 0.9020 | −0.0023 | 0.1479 |
| 2 | 1.0242 | 0.2828 | 0.3257 | 1.0052 | 0.2819 | 0.3382 | 0.8988 | 0.2916 | 0.1314 | 0.9199 | 0.2923 | 0.1230 |
| 3 | 0.9635 | 0.5458 | 0.3022 | 0.9418 | 0.5397 | 0.3142 | 0.8455 | 0.5441 | 0.1109 | 0.8689 | 0.5508 | 0.1033 |
| 4 | 0.8589 | 0.7738 | 0.2805 | 0.8360 | 0.7621 | 0.2921 | 0.7509 | 0.7555 | 0.0944 | 0.7752 | 0.7680 | 0.0875 |
| 5 | 0.7296 | 0.9607 | 0.2611 | 0.7064 | 0.9434 | 0.2723 | 0.6346 | 0.9267 | 0.0809 | 0.6589 | 0.9448 | 0.0745 |
| 6 | 0.5910 | 1.1087 | 0.2441 | 0.5683 | 1.0861 | 0.2549 | 0.5102 | 1.0625 | 0.0697 | 0.5339 | 1.0857 | 0.0637 |
| 7 | 0.4536 | 1.2236 | 0.2294 | 0.4318 | 1.1963 | 0.2398 | 0.3863 | 1.1689 | 0.0605 | 0.4092 | 1.1967 | 0.0548 |
| 8 | 0.3234 | 1.3123 | 0.2167 | 0.3025 | 1.2807 | 0.2268 | 0.2681 | 1.2519 | 0.0527 | 0.2900 | 1.2839 | 0.0473 |
| 9 | 0.2031 | 1.3809 | 0.2057 | 0.1833 | 1.3452 | 0.2156 | 0.1581 | 1.3167 | 0.0462 | 0.1790 | 1.3527 | 0.0410 |
| 10 | 0.0939 | 1.4343 | 0.1963 | 0.0750 | 1.3949 | 0.2059 | 0.0572 | 1.3677 | 0.0407 | 0.0772 | 1.4073 | 0.0358 |
| 11 | −0.0045 | 1.4764 | 0.1882 | −0.0226 | 1.4335 | 0.1975 | −0.0345 | 1.4081 | 0.0361 | −0.0152 | 1.4511 | 0.0313 |
| 12 | −0.0927 | 1.5102 | 0.1812 | −0.1102 | 1.4640 | 0.1902 | −0.1174 | 1.4406 | 0.0321 | −0.0988 | 1.4868 | 0.0275 |
| 13 | −0.1717 | 1.5377 | 0.1751 | −0.1887 | 1.4883 | 0.1839 | −0.1924 | 1.4670 | 0.0287 | −0.1741 | 1.5164 | 0.0242 |
| 14 | −0.2423 | 1.5606 | 0.1699 | −0.2591 | 1.5081 | 0.1784 | −0.2600 | 1.4887 | 0.0257 | −0.2421 | 1.5411 | 0.0214 |
| 15 | −0.3057 | 1.5799 | 0.1653 | −0.3224 | 1.5245 | 0.1736 | −0.3212 | 1.5070 | 0.0232 | −0.3034 | 1.5623 | 0.0190 |
| 16 | −0.3627 | 1.5967 | 0.1613 | −0.3794 | 1.5383 | 0.1693 | −0.3767 | 1.5225 | 0.0209 | −0.3587 | 1.5807 | 0.0169 |
| 17 | −0.4139 | 1.6114 | 0.1577 | −0.4310 | 1.5502 | 0.1656 | −0.4270 | 1.5359 | 0.0189 | −0.4089 | 1.5968 | 0.0151 |

TABLE 2-continued

| station number | X | Y | Z | X | Y | Z | X | Y | Z | X | Y | Z |
|---|---|---|---|---|---|---|---|---|---|---|---|---|
| | shroud pressure side | | | shroud suction side | | | hub suction side | | | hub pressure side | | |
| 18 | −0.4602 | 1.6245 | 0.1546 | −0.4777 | 1.5605 | 0.1622 | −0.4729 | 1.5476 | 0.0172 | −0.4544 | 1.6113 | 0.0135 |
| 19 | −0.5022 | 1.6364 | 0.1519 | −0.5203 | 1.5697 | 0.1593 | −0.5148 | 1.5581 | 0.0157 | −0.4958 | 1.6244 | 0.0120 |
| 20 | −0.5403 | 1.6474 | 0.1495 | −0.5592 | 1.5780 | 0.1566 | −0.5533 | 1.5675 | 0.0143 | −0.5335 | 1.6364 | 0.0108 |
| 21 | −0.5750 | 1.6576 | 0.1474 | −0.5948 | 1.5856 | 0.1542 | −0.5886 | 1.5760 | 0.0131 | −0.5680 | 1.6476 | 0.0096 |
| 22 | −0.6072 | 1.6659 | 0.1457 | −0.6272 | 1.5939 | 0.1520 | −0.6210 | 1.5852 | 0.0119 | −0.6000 | 1.6566 | 0.0087 |
| 23 | −0.6367 | 1.6736 | 0.1441 | −0.6572 | 1.6017 | 0.1500 | −0.6507 | 1.5938 | 0.0108 | −0.6293 | 1.6652 | 0.0078 |
| 24 | −0.6637 | 1.6809 | 0.1427 | −0.6849 | 1.6092 | 0.1482 | −0.6783 | 1.6021 | 0.0099 | −0.6564 | 1.6732 | 0.0070 |
| 25 | −0.6886 | 1.6880 | 0.1415 | −0.7105 | 1.6164 | 0.1465 | −0.7039 | 1.6099 | 0.0090 | −0.6814 | 1.6809 | 0.0063 |
| 26 | −0.7116 | 1.6947 | 0.1405 | −0.7343 | 1.6234 | 0.1451 | −0.7277 | 1.6175 | 0.0082 | −0.7045 | 1.6882 | 0.0057 |
| 27 | −0.7329 | 1.7013 | 0.1395 | −0.7564 | 1.6302 | 0.1437 | −0.7499 | 1.6247 | 0.0075 | −0.7261 | 1.6953 | 0.0051 |
| 28 | −0.7527 | 1.7076 | 0.1387 | −0.7771 | 1.6368 | 0.1425 | −0.7707 | 1.6318 | 0.0068 | −0.7462 | 1.7020 | 0.0045 |
| 29 | −0.7711 | 1.7138 | 0.1379 | −0.7964 | 1.6433 | 0.1415 | −0.7903 | 1.6386 | 0.0061 | −0.7651 | 1.7086 | 0.0040 |
| 30 | −0.7884 | 1.7198 | 0.1373 | −0.8146 | 1.6496 | 0.1405 | −0.8087 | 1.6452 | 0.0056 | −0.7827 | 1.7150 | 0.0035 |
| 31 | −0.8046 | 1.7258 | 0.1367 | −0.8317 | 1.6559 | 0.1396 | −0.8261 | 1.6517 | 0.0050 | −0.7994 | 1.7212 | 0.0030 |
| 32 | −0.8198 | 1.7316 | 0.1362 | −0.8478 | 1.6620 | 0.1388 | −0.8425 | 1.6581 | 0.0045 | −0.8151 | 1.7272 | 0.0026 |
| 33 | −0.8342 | 1.7373 | 0.1357 | −0.8630 | 1.6680 | 0.1381 | −0.8582 | 1.6643 | 0.0040 | −0.8300 | 1.7332 | 0.0022 |
| 34 | −0.8479 | 1.7429 | 0.1354 | −0.8775 | 1.6740 | 0.1375 | −0.8730 | 1.6704 | 0.0035 | −0.8441 | 1.7390 | 0.0018 |
| 35 | −0.8609 | 1.7484 | 0.1350 | −0.8913 | 1.6798 | 0.1369 | −0.8872 | 1.6764 | 0.0031 | −0.8575 | 1.7446 | 0.0014 |
| 36 | −0.8733 | 1.7538 | 0.1348 | −0.9045 | 1.6856 | 0.1364 | −0.9007 | 1.6823 | 0.0027 | −0.8703 | 1.7502 | 0.0010 |
| 37 | −0.8851 | 1.7592 | 0.1345 | −0.9170 | 1.6913 | 0.1360 | −0.9137 | 1.6881 | 0.0023 | −0.8826 | 1.7557 | 0.0007 |
| 38 | −0.8985 | 1.7644 | 0.1343 | −0.9291 | 1.6969 | 0.1356 | −0.9262 | 1.6939 | 0.0019 | −0.8943 | 1.7611 | 0.0003 |
| 39 | −0.9075 | 1.7697 | 0.1342 | −0.9407 | 1.7024 | 0.1353 | −0.9381 | 1.6995 | 0.0015 | −0.9056 | 1.7665 | 0.0000 |
| 40 | −0.9181 | 1.7749 | 0.1341 | −0.9519 | 1.7079 | 0.1350 | −0.9497 | 1.7052 | 0.0016 | −0.9164 | 1.7717 | −0.0016 |
| 41 | −1.1898 | 1.9076 | 0.1341 | −1.2183 | 1.8382 | 0.1350 | −1.2164 | 1.8353 | 0.0016 | −1.1876 | 1.9048 | −0.0016 |

TABLE 3

| station number | X | Y | Z | X | Y | Z | X | Y | Z | X | Y | Z |
|---|---|---|---|---|---|---|---|---|---|---|---|---|
| | shroud pressure side | | | shroud suction side | | | hub suction side | | | hub pressure side | | |
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 |
| 6 | −0.1745 | 1.2379 | 0.2463 | −0.1776 | 1.2192 | 0.2527 | −0.2107 | 1.1661 | 0.0685 | −0.2074 | 1.1855 | 0.0649 |
| 7 | −0.3526 | 1.2497 | 0.2314 | −0.3536 | 1.2285 | 0.2378 | −0.3741 | 1.1798 | 0.0594 | −0.3728 | 1.2016 | 0.0559 |
| 8 | −0.5094 | 1.2445 | 0.2186 | −0.5084 | 1.2211 | 0.2249 | −0.5192 | 1.1778 | 0.0517 | −0.5199 | 1.2017 | 0.0483 |
| 9 | −0.6464 | 1.2290 | 0.2076 | −0.6433 | 1.2036 | 0.2137 | −0.6469 | 1.1659 | 0.0453 | −0.6495 | 1.1918 | 0.0420 |
| 10 | −0.7657 | 1.2078 | 0.1981 | −0.7607 | 1.1804 | 0.2041 | −0.7590 | 1.1481 | 0.0398 | −0.7635 | 1.1759 | 0.0367 |
| 11 | −0.8696 | 1.1838 | 0.1899 | −0.8628 | 1.1546 | 0.1959 | −0.8574 | 1.1271 | 0.0352 | −0.8636 | 1.1568 | 0.0321 |
| 12 | −0.9604 | 1.1590 | 0.1828 | −0.9519 | 1.1280 | 0.1887 | −0.9440 | 1.1048 | 0.0313 | −0.9518 | 1.1363 | 0.0283 |
| 13 | −1.0401 | 1.1346 | 0.1766 | −1.0301 | 1.1018 | 0.1824 | −1.0205 | 1.0824 | 0.0279 | −1.0298 | 1.1157 | 0.0250 |
| 14 | −1.1104 | 1.1113 | 0.1713 | −1.0990 | 1.0766 | 0.1770 | −1.0883 | 1.0604 | 0.0250 | −1.0990 | 1.0956 | 0.0222 |
| 15 | −1.1728 | 1.0894 | 0.1666 | −1.1601 | 1.0530 | 0.1722 | −1.1488 | 1.0395 | 0.0225 | −1.1608 | 1.0764 | 0.0197 |
| 16 | −1.2285 | 1.0692 | 0.1626 | −1.2146 | 1.0309 | 0.1680 | −1.2030 | 1.0197 | 0.0203 | −1.2162 | 1.0584 | 0.0176 |
| 17 | −1.2785 | 1.0507 | 0.1590 | −1.2635 | 1.0105 | 0.1643 | −1.2519 | 1.0011 | 0.0183 | −1.2661 | 1.0418 | 0.0157 |
| 18 | −1.3235 | 1.0338 | 0.1559 | −1.3075 | 0.9917 | 0.1610 | −1.2961 | 0.9839 | 0.0166 | −1.3112 | 1.0265 | 0.0141 |
| 19 | −1.3643 | 1.0185 | 0.1531 | −1.3475 | 0.9744 | 0.1581 | −1.3362 | 0.9680 | 0.0151 | −1.3523 | 1.0125 | 0.0126 |
| 20 | −1.4015 | 1.0047 | 0.1506 | −1.3839 | 0.9585 | 0.1555 | −1.3730 | 0.9533 | 0.0137 | −1.3897 | 0.9997 | 0.0113 |
| 21 | −1.4355 | 0.9922 | 0.1485 | −1.4167 | 0.9440 | 0.1532 | −1.4067 | 0.9397 | 0.0125 | −1.4241 | 0.9881 | 0.0102 |
| 22 | −1.4668 | 0.9810 | 0.1466 | −1.4480 | 0.9307 | 0.1511 | −1.4378 | 0.9272 | 0.0114 | −1.4557 | 0.9776 | 0.0091 |
| 23 | −1.4956 | 0.9709 | 0.1449 | −1.4764 | 0.9185 | 0.1492 | −1.4666 | 0.9157 | 0.0105 | −1.4849 | 0.9683 | 0.0082 |
| 24 | −1.5222 | 0.9619 | 0.1434 | −1.5028 | 0.9073 | 0.1476 | −1.4933 | 0.9052 | 0.0096 | −1.5119 | 0.9599 | 0.0074 |
| 25 | −1.5469 | 0.9539 | 0.1420 | −1.5270 | 0.8971 | 0.1461 | −1.5182 | 0.8956 | 0.0087 | −1.5370 | 0.9524 | 0.0066 |
| 26 | −1.5699 | 0.9468 | 0.1409 | −1.5503 | 0.8878 | 0.1447 | −1.5415 | 0.8867 | 0.0080 | −1.5604 | 0.9457 | 0.0059 |
| 27 | −1.5913 | 0.9405 | 0.1398 | −1.5718 | 0.8793 | 0.1434 | −1.5633 | 0.8786 | 0.0073 | −1.5824 | 0.9397 | 0.0052 |
| 28 | −1.6114 | 0.9350 | 0.1389 | −1.5920 | 0.8715 | 0.1423 | −1.5839 | 0.8710 | 0.0066 | −1.6030 | 0.9343 | 0.0046 |
| 29 | −1.6303 | 0.9302 | 0.1381 | −1.6111 | 0.8644 | 0.1413 | −1.6034 | 0.8641 | 0.0061 | −1.6224 | 0.9296 | 0.0041 |
| 30 | −1.6482 | 0.9260 | 0.1374 | −1.6292 | 0.8578 | 0.1404 | −1.6219 | 0.8577 | 0.0055 | −1.6408 | 0.9253 | 0.0035 |
| 31 | −1.6650 | 0.9222 | 0.1367 | −1.6464 | 0.8518 | 0.1396 | −1.6395 | 0.8517 | 0.0050 | −1.6582 | 0.9216 | 0.0030 |
| 32 | −1.6810 | 0.9190 | 0.1362 | −1.6628 | 0.8463 | 0.1388 | −1.6562 | 0.8462 | 0.0045 | −1.6747 | 0.9183 | 0.0026 |
| 33 | −1.6961 | 0.9151 | 0.1357 | −1.6787 | 0.8422 | 0.1381 | −1.6725 | 0.8420 | 0.0040 | −1.6902 | 0.9143 | 0.0022 |
| 34 | −1.7104 | 0.9116 | 0.1354 | −1.6939 | 0.8385 | 0.1375 | −1.6881 | 0.8382 | 0.0035 | −1.7050 | 0.9107 | 0.0018 |
| 35 | −1.7241 | 0.9084 | 0.1350 | −1.7085 | 0.8351 | 0.1369 | −1.7031 | 0.8347 | 0.0031 | −1.7192 | 0.9074 | 0.0014 |
| 36 | −1.7374 | 0.9055 | 0.1348 | −1.7225 | 0.8320 | 0.1364 | −1.7175 | 0.8316 | 0.0027 | −1.7329 | 0.9044 | 0.0010 |
| 37 | −1.7501 | 0.9029 | 0.1345 | −1.7360 | 0.8293 | 0.1360 | −1.7315 | 0.8286 | 0.0023 | −1.7460 | 0.9016 | 0.0007 |
| 38 | −1.7624 | 0.9005 | 0.1343 | −1.7490 | 0.8267 | 0.1356 | −1.7449 | 0.8260 | 0.0019 | −1.7587 | 0.8991 | 0.0003 |
| 39 | −1.7743 | 0.8983 | 0.1342 | −1.7617 | 0.8244 | 0.1353 | −1.7579 | 0.8235 | 0.0015 | −1.7710 | 0.8968 | 0.0000 |
| 40 | −1.7860 | 0.8963 | 0.1341 | −1.7740 | 0.8222 | 0.1350 | −1.7706 | 0.8213 | 0.0016 | −1.7828 | 0.8947 | −0.0016 |
| 41 | −2.0839 | 0.8440 | 0.1341 | −2.0661 | 0.7711 | 0.1350 | −2.0628 | 0.7698 | 0.0016 | −2.0804 | 0.8429 | −0.0016 |

TABLE 4

| station number | X Y Z shroud pressure side | | | X Y Z shroud suction side | | | X Y Z hub suction side | | | X Y Z hub pressure side | | |
|---|---|---|---|---|---|---|---|---|---|---|---|---|
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 |
| 13 | −0.6387 | 1.3932 | 0.1779 | −0.6391 | 1.3735 | 0.1812 | −0.6358 | 1.3521 | 0.0273 | −0.6350 | 1.3719 | 0.0256 |
| 14 | −0.7127 | 1.3929 | 0.1724 | −0.7126 | 1.3707 | 0.1759 | −0.7073 | 1.3520 | 0.0244 | −0.7069 | 1.3744 | 0.0227 |
| 15 | −0.7786 | 1.3916 | 0.1676 | −0.7781 | 1.3669 | 0.1712 | −0.7715 | 1.3505 | 0.0220 | −0.7714 | 1.3754 | 0.0202 |
| 16 | −0.8378 | 1.3898 | 0.1635 | −0.8368 | 1.3625 | 0.1671 | −0.8292 | 1.3483 | 0.0198 | −0.8295 | 1.3757 | 0.0180 |
| 17 | −0.8909 | 1.3878 | 0.1598 | −0.8897 | 1.3580 | 0.1635 | −0.8814 | 1.3456 | 0.0179 | −0.8821 | 1.3754 | 0.0161 |
| 18 | −0.9390 | 1.3858 | 0.1566 | −0.9374 | 1.3536 | 0.1603 | −0.9288 | 1.3427 | 0.0162 | −0.9297 | 1.3750 | 0.0144 |
| 19 | −0.9825 | 1.3841 | 0.1537 | −0.9808 | 1.3493 | 0.1574 | −0.9720 | 1.3397 | 0.0148 | −0.9731 | 1.3746 | 0.0129 |
| 20 | −1.0221 | 1.3826 | 0.1512 | −1.0203 | 1.3453 | 0.1549 | −1.0115 | 1.3369 | 0.0134 | −1.0127 | 1.3742 | 0.0116 |
| 21 | −1.0584 | 1.3814 | 0.1490 | −1.0565 | 1.3416 | 0.1527 | −1.0478 | 1.3342 | 0.0123 | −1.0489 | 1.3740 | 0.0104 |
| 22 | −1.0916 | 1.3806 | 0.1470 | −1.0898 | 1.3383 | 0.1506 | −1.0812 | 1.3317 | 0.0112 | −1.0823 | 1.3740 | 0.0094 |
| 23 | −1.1222 | 1.3801 | 0.1453 | −1.1206 | 1.3352 | 0.1488 | −1.1121 | 1.3295 | 0.0102 | −1.1129 | 1.3743 | 0.0084 |
| 24 | −1.1504 | 1.3799 | 0.1437 | −1.1490 | 1.3326 | 0.1472 | −1.1407 | 1.3276 | 0.0094 | −1.1413 | 1.3748 | 0.0076 |
| 25 | −1.1764 | 1.3801 | 0.1424 | −1.1755 | 1.3303 | 0.1457 | −1.1673 | 1.3259 | 0.0086 | −1.1675 | 1.3756 | 0.0068 |
| 26 | −1.2005 | 1.3807 | 0.1412 | −1.2001 | 1.3283 | 0.1444 | −1.1921 | 1.3245 | 0.0078 | −1.1919 | 1.3767 | 0.0060 |
| 27 | −1.2229 | 1.3816 | 0.1401 | −1.2232 | 1.3267 | 0.1432 | −1.2154 | 1.3233 | 0.0071 | −1.2147 | 1.3780 | 0.0054 |
| 28 | −1.2437 | 1.3828 | 0.1391 | −1.2448 | 1.3253 | 0.1421 | −1.2373 | 1.3223 | 0.0065 | −1.2360 | 1.3795 | 0.0048 |
| 29 | −1.2632 | 1.3842 | 0.1383 | −1.2651 | 1.3243 | 0.1411 | −1.2579 | 1.3215 | 0.0059 | −1.2559 | 1.3811 | 0.0042 |
| 30 | −1.2816 | 1.3858 | 0.1375 | −1.2842 | 1.3235 | 0.1402 | −1.2774 | 1.3209 | 0.0054 | −1.2747 | 1.3830 | 0.0036 |
| 31 | −1.2988 | 1.3877 | 0.1369 | −1.3024 | 1.3229 | 0.1394 | −1.2959 | 1.3205 | 0.0049 | −1.2925 | 1.3850 | 0.0031 |
| 32 | −1.3151 | 1.3898 | 0.1363 | −1.3196 | 1.3225 | 0.1387 | −1.3135 | 1.3202 | 0.0044 | −1.3092 | 1.3871 | 0.0027 |
| 33 | −1.3305 | 1.3920 | 0.1358 | −1.3361 | 1.3222 | 0.1380 | −1.3303 | 1.3201 | 0.0039 | −1.3252 | 1.3894 | 0.0022 |
| 34 | −1.3451 | 1.3943 | 0.1354 | −1.3518 | 1.3221 | 0.1375 | −1.3464 | 1.3201 | 0.0035 | −1.3403 | 1.3918 | 0.0018 |
| 35 | −1.3590 | 1.3968 | 0.1350 | −1.3668 | 1.3222 | 0.1369 | −1.3618 | 1.3202 | 0.0031 | −1.3547 | 1.3943 | 0.0014 |
| 36 | −1.3725 | 1.3981 | 0.1348 | −1.3811 | 1.3236 | 0.1364 | −1.3765 | 1.3216 | 0.0027 | −1.3686 | 1.3956 | 0.0010 |
| 37 | −1.3854 | 1.3995 | 0.1345 | −1.3948 | 1.3251 | 0.1360 | −1.3906 | 1.3231 | 0.0023 | −1.3820 | 1.3971 | 0.0007 |
| 38 | −1.3979 | 1.4010 | 0.1343 | −1.4080 | 1.3267 | 0.1356 | −1.4043 | 1.3248 | 0.0019 | −1.3948 | 1.3986 | 0.0003 |
| 39 | −1.4099 | 1.4026 | 0.1342 | −1.4207 | 1.3284 | 0.1353 | −1.4174 | 1.3265 | 0.0015 | −1.4072 | 1.4002 | 0.0000 |
| 40 | −1.4216 | 1.4043 | 0.1341 | −1.4331 | 1.3302 | 0.1350 | −1.4301 | 1.3283 | 0.0016 | −1.4190 | 1.4018 | −0.0016 |
| 41 | −1.7211 | 1.4466 | 0.1341 | −1.7267 | 1.3718 | 0.1350 | −1.7240 | 1.3696 | 0.0016 | −1.7181 | 1.4445 | −0.0016 |

What is claimed is:

1. An impeller for a jet engine mounted boost fuel pump comprising:
   an inducer section with a hub including a plurality of blades extended therefrom, each of the plurality of blades including a root, a tip, first and second surfaces, wherein the each of the first and second surfaces is defined as a set X, Y, and Z Cartesian coordinates set out in TABLE 1; and
   an impeller section with a hub including a plurality of blades extended therefrom, each of the plurality of blades including a root, a tip, and opposed pressure and suction sides extending from the root to the tip, wherein the each of the pressure and suction sides is a surface defined as a set X, Y, and Z Cartesian coordinates set out in at least one of TABLES 2 through 4.

2. The impeller pump as recited in claim 1, wherein the plurality of blades of the impeller includes a set of long blades, the pressure and suction sides of which are defined by TABLE 2.

3. The impeller pump as recited in claim 1, wherein the plurality of blades of the impeller includes a set of primary splitter blades, the pressure and suction sides of which are defined by TABLE 3.

4. The impeller pump as recited in claim 1, wherein the plurality of blades of the impeller includes a set of secondary splitter blades, the pressure and suction sides of which are defined by TABLE 4.

5. The impeller pump as recited in claim 1, wherein the plurality of blades of the inducer are axial blades.

6. The impeller pump as recited in claim 1, wherein the plurality of blades of the impeller are radial blades.

7. The impeller pump as recited in claim 1, wherein the plurality of blades of the impeller section includes a set of long blades, the pressure and suction sides of which are defined by TABLE 2, wherein the plurality of blades of the impeller includes a set of primary splitter blades, the pressure and suction sides of which are defined by TABLE 3, and wherein the plurality of blades of the impeller includes a set of secondary splitter blades, the pressure and suction sides of which are defined by TABLE 4.

8. The impeller pump as recited in claim 7, wherein the plurality of blades of the impeller are arranged in a repeating, circumferential pattern in this order: secondary splitter blade, primary splitter blade, long blade going clockwise as viewed toward the inducer.

9. A boost pump comprising:
   a boost cover and a main pump housing engaged opposite to the boost cover with an impeller rotatably engaged between the boost cover and main pump housing, wherein the impeller includes:
   an inducer section with a hub including a plurality of blades extended therefrom, each of the plurality of blades including a root, a tip, first and second surfaces, wherein the each of the first and second surfaces is defined as a set X, Y, and Z Cartesian coordinates set out in TABLE 1; and an impeller section including a plurality of blades extended from the hub, each of the plurality of blades including a root, a tip, and opposed pressure and suction sides extending from the root to the tip, wherein the each of the pressure and suction sides is a surface defined as a set X, Y, and Z Cartesian coordinates set out in at least one of TABLES 2-4.

10. The boost pump as recited in claim 9, wherein the plurality of blades of the impeller includes a set of long blades, the pressure and suction sides of which are defined by TABLE 2.

11. The boost pump as recited in claim 9, wherein the plurality of blades of the impeller includes a set of primary splitter blades, the pressure and suction sides of which are defined by TABLE 3.

12. The boost pump as recited in claim 9, wherein the plurality of blades of the impeller includes a set of secondary splitter blades, the pressure and suction sides of which are defined by TABLE 4.

13. The boost pump as recited in claim 9, wherein the plurality of blades of the inducer are axial blades.

14. The boost pump as recited in claim 9, wherein the plurality of blades of the impeller are radial blades.

15. A method of forming an impeller for a boost pump comprising: forming an impeller including an inducer section with a hub including a plurality of blades extended therefrom, each of the plurality of blades including a root, a tip, first and second surfaces, wherein the each of the first and second surfaces is defined as a set X, Y, and Z Cartesian coordinates set out in TABLE 1, and an impeller section including a plurality of blades extended from the hub, each of the plurality of blades including a root, a tip, and opposed pressure and suction sides extending from the root to the tip, wherein the each of the pressure and suction sides is a surface defined as a set X, Y, and Z Cartesian coordinates set out in at least one of TABLES 2-4.

16. The method as recited in claim 15, wherein the forming includes machining the blades.

17. The method as recited in claim 15, wherein forming includes casting the blades.

* * * * *